(12) United States Patent
Heideman

(10) Patent No.: US 6,988,600 B1
(45) Date of Patent: Jan. 24, 2006

(54) HIGH FREQUENCY DAMPENING APPARATUS

(75) Inventor: Robert Heideman, Westland, MI (US)

(73) Assignee: Ace Controls, Inc., Farmington Hills, MI (US)

( * ) Notice: Subject to any disclaimer, the term of this patent is extended or adjusted under 35 U.S.C. 154(b) by 0 days.

(21) Appl. No.: 10/122,773

(22) Filed: Apr. 15, 2002

Related U.S. Application Data

(60) Provisional application No. 60/283,692, filed on Apr. 13, 2001, provisional application No. 60/286,939, filed on Apr. 27, 2001.

(51) Int. Cl.
   F16F 9/00    (2006.01)
   F16F 9/18    (2006.01)

(52) U.S. Cl. .............................. 188/322.22; 188/282.6; 267/124

(58) Field of Classification Search ................ 188/281, 188/282.1, 282.6, 323.16, 322.21, 322.2; 267/124
   See application file for complete search history.

(56) References Cited

U.S. PATENT DOCUMENTS

| | | | |
|---|---|---|---|
| 4,099,602 A | * | 7/1978 | Kourbetsos ................. 188/300 |
| 4,467,899 A | * | 8/1984 | Molders et al. ............. 188/320 |
| 4,989,700 A | * | 2/1991 | Popjoy ................... 188/322.18 |
| 5,560,456 A | * | 10/1996 | Koch et al. ................. 188/300 |
| 5,964,454 A | * | 10/1999 | Volpel ........................ 267/124 |
| 6,315,093 B1 | * | 11/2001 | Miura et al. ............. 188/282.1 |

* cited by examiner

Primary Examiner—Xuan Lan Nguyen
(74) Attorney, Agent, or Firm—Price, Heneveld, Cooper, DeWitt & Litton, LLP

(57) ABSTRACT

A high frequency dampening apparatus for dampening the travel of a high frequency cycling driver. The present invention provides an enclosed housing having a fluid disposed therein. A piston rod is partially disposed within the housing and is engageable with a high frequency driver wherein the piston rod moves between a rearward position and a forward position relative to the housing. A plurality of fingers are circumferentially spaced and extend radially outward from the piston rod. A piston head retainer is connected to and extends radially outward from the piston rod and provides an orifice extending therethrough. A piston head is captured between the fingers and the piston head retainer and is movable between the rearward position, wherein the fingers engage the piston head allowing the fluid to freely flow between the fingers to allow said piston rod to freely travel to said rearward position, and the forward position, wherein the piston head retainer engages the piston head and forces fluid to flow through the orifice to slow the travel of the piston rod toward the forward position.

19 Claims, 3 Drawing Sheets

HIGH FREQUENCY DAMPENING APPARATUS

The following patent application claims priority of provisional patent applications Ser. No. 60/283,692 filed Apr. 13, 2001 and Ser. No. 60/286,939 filed Apr. 27, 2001.

FIELD OF THE INVENTION

The present invention relates to a dampening apparatus, and more particularly, a dampening apparatus that may be utilized for high frequency cycling of an object.

BACKGROUND OF THE INVENTION

Fluid dampeners and linear decelerators are commonly used to maintain or reduce the velocity or acceleration of an object or apparatus. These applications are typically utilized to control the speed or acceleration of an object so that the object may be more easily controlled or manipulated.

Many of these fluid dampeners or linear decelerators utilize "accumulator" designs, that is, they displace oil or fluid from a chamber to a reservoir. The reservoir may contain some method or device by which the oil or fluid is pressurized so that when given the opportunity, the oil or fluid may freely flow back to its original chamber. Commonly known designs have utilized foam inserts and/or flexible bladders to create a pressurized reservoir for the oil or fluid. Other designs utilize spring biased plates or walls which move and compress the spring under the pressure of oil or fluid.

The disadvantage with such fluid dampeners and linear decelerators is that they can only function under moderate cycle times when utilized to dampen the cycling by an object or device. Typically, the fastest cycle rates that these devices can be utilized for is one standard cycle per second. The speed at which such fluid dampeners and linear decelerators can cycle is a function of how fast the fluid or oil can move between a chamber and the accumulating reservoir. Such designs prevent these devices from providing quick repetitive cycling.

An example of a fast cycle rate application is the bolt action of a fully automatic firearm or what is commonly referred to a as a "machine gun". The rate at which the bolt action of these firearms opens and closes between firing rounds is approximately 1800 rounds per minute or 30 rounds or cycles per second. This is what is deemed to be the natural frequency of the machine gun's bolt action. However, the natural frequency of the machine gun is far too fast for an operator to safely and accurately operate the firearm. The speed at which a user can accurately and safely utilize such a firearm is approximately 750 rounds per minute or 12½ rounds or cycles per second.

It would be desirable to provide a fluid dampener that could properly operate at a high frequency cycling rate.

SUMMARY OF THE INVENTION

The present invention provides a high frequency dampening apparatus for dampening the travel of an object under high cyclical rates. The high frequency dampening apparatus provides an enclosed housing having a fluid or oil disposed therein. A piston rod is disposed within the housing and is engageable with a high frequency driver wherein the piston rod may move between a rearward position and a forward position relative to the housing. A first structure extends from the piston rod and has a first passageway extending therethrough. A second structure also extends from the piston rod and is axially spaced from the first structure. The second structure provides a second passageway smaller than the first passageway. A spring engages the second structure to bias the piston rod toward the forward position. A piston head is captured between the first and second structures and is movable between the rearward position, wherein the first structure engages the piston head when moving toward the rearward position allowing fluid to freely flow through the first passageway to allow the piston rod to freely travel further rearward into the housing, and the forward position, wherein the second structure engages the piston head when moving toward the forward position allowing fluid to flow through the orifice of the second structure to slow the travel of the piston rod toward the forward position.

The first structure may be fabricated from a plurality of finger-like projections that are circumferentially spaced from one another. The second structure may comprise a retainer having an aperture extending therethrough.

BRIEF DESCRIPTION OF THE DRAWINGS

The description herein makes reference to the accompanying drawing wherein like reference numerals refer to like parts throughout several views and wherein.

DETAILED DESCRIPTION OF THE PRESENT INVENTION

Figure 1:
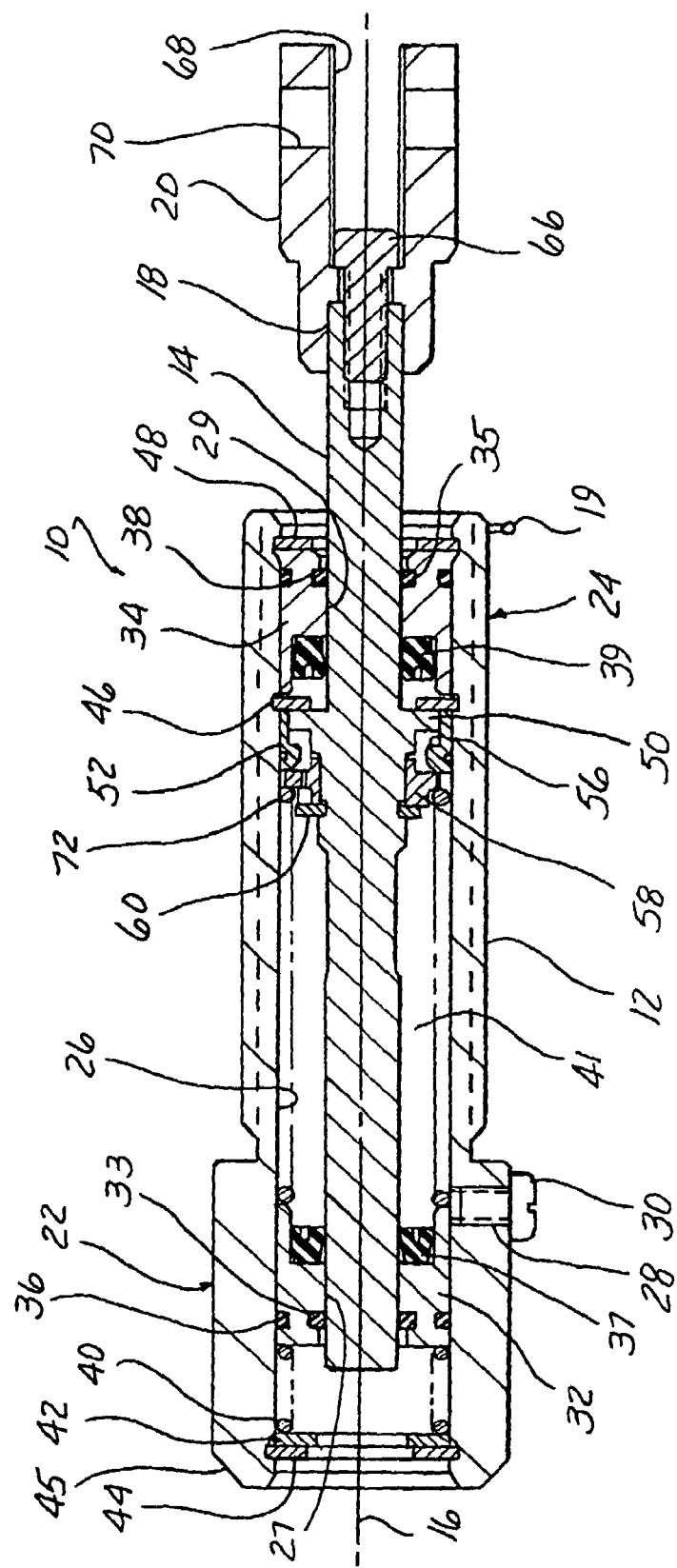
FIG. 1 is a sectional view of the high frequency dampening apparatus of the present invention.

Referring to the drawings, the present invention will now be described in detail with reference to the preferred embodiment.

FIG. 1 depicts a high frequency dampening apparatus 10 of the present invention. The apparatus 10 provides an enclosed housing 12 having a fluid or oil disposed therein. A piston rod 14 is slidably received along a longitudinal axis 16 of the housing 12. One end 18 of the piston rod 14 extends beyond a forward end 19 of the housing 12 wherein a clevis 20 is connected to the end 18 of the piston rod 14. The clevis 20 may be pivotally connectable to a driving member (not shown), such as a bolt action of an automatic firearm. Although the present invention may be best suited for dampening the bolt action of an automatic firearm, the present invention is not limited to such an application. The present invention may be utilized for any application in which it is desirable to dampen a high frequency cycling member.

Figure 2A:
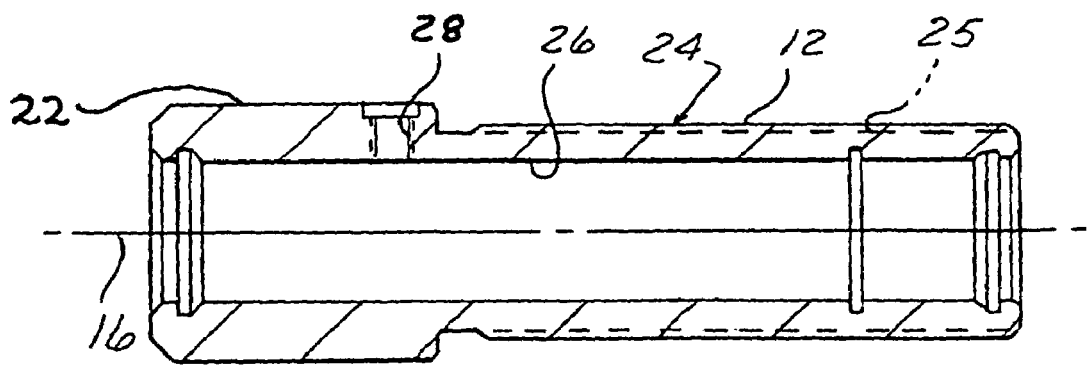
FIG. 2A is a sectional view of the housing of the present invention.
Figure 3A:
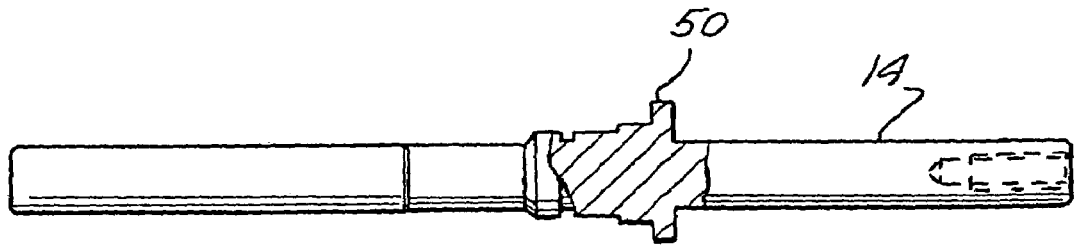
FIG. 3A is a sectional plan view of the piston rod of the present invention.
Figure 2B:
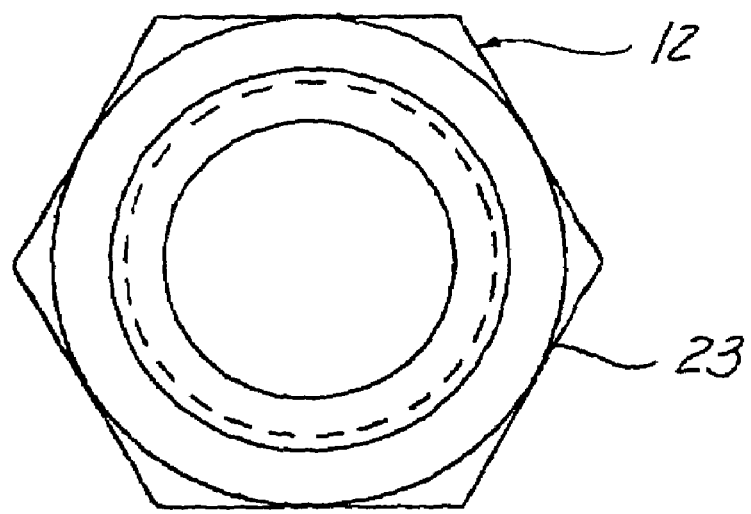
FIG. 2B is a side view of the housing of the present invention.

In order to mount the apparatus 10, a rearward portion 22 of the outer surface of the housing 12 may have a substantially hexagonal configuration 23, and a forward portion 24 of the housing 12 may have an externally threaded, substantially cylindrical configuration. As seen in FIGS. 1, 2A and 2B, the external threads 25 of the forward portion 24 of the housing 12 allows the apparatus 10 to be threaded into a threaded bore of a mounting structure (not shown), and the hexagonal shape 23 of the rearward portion 22 allows the engagement of a tool (not shown) to secure the apparatus 10 within the mounting structure. The housing 12 has a substantially cylindrical throughbore 26 extending along the longitudinal axis 16 of the housing 12. An aperture 28 extends through a side wall of the housing 12 at a direction substantially perpendicular to the longitudinal axis 16 of the housing 12. The aperture 28 is utilized as a fill port for supplying fluid or oil to the inside of the housing 12. The aperture 28 may be plugged by a threaded bleed screw 30, as seen in FIGS. 1 and 2A, or may be plugged by a conventional plug (not shown).

To allow the piston rod 14 to slide within the housing 12, the piston rod 14 is slidably supported along the longitudinal axis 16 of the housing 12 by a pair of piston rod bearings 32, 34, as seen in FIG. 1. Each of the piston rod bearings 32, 34 provides a bore 27, 29 respectively for slidably receiving the piston rod 14 and is sealed against the inner wall or bore 26 of the housing 12 by O-rings 36, 38, respectively. The O-ring 36 also allows the piston rod bearing 32 to slide with respect to the inner wall 26 of the housing 12. The bearings 32, 34 provide a sealed engagement against the piston rod 14 through the use of a wiper O-ring 33, 35, respectively, and a U-cup seal 37, 39, respectively. The sealed engagement of the bearings 32, 34 to the inner wall 26 of the housing 12 and the piston rod 14 provides a sealed chamber 41 for the fluid or oil.

The piston rod bearing 32 is in a rearward end 45 of the housing 12, as viewed in FIG. 1, and is seated against a first compression spring 40 that is completely compressed when the sealed chamber 41 is filled with fluid or oil. The compression spring 40 is seated against a washer 42 which is retained by a snap ring 44. The compression spring 40 biases and may slide the bearing 32 toward the forward end 19 of the housing 12 to maintain constant fluid pressure of the fluid or oil within the sealed chamber 41 by forcing the fluid or oil against the forward bearing 34. The bearing 34 in the forward end 19 of the housing 12 is seated between snap rings 46 and 48 to ensure that the bearing 34 remains in a fixed position.

Figure 3B:
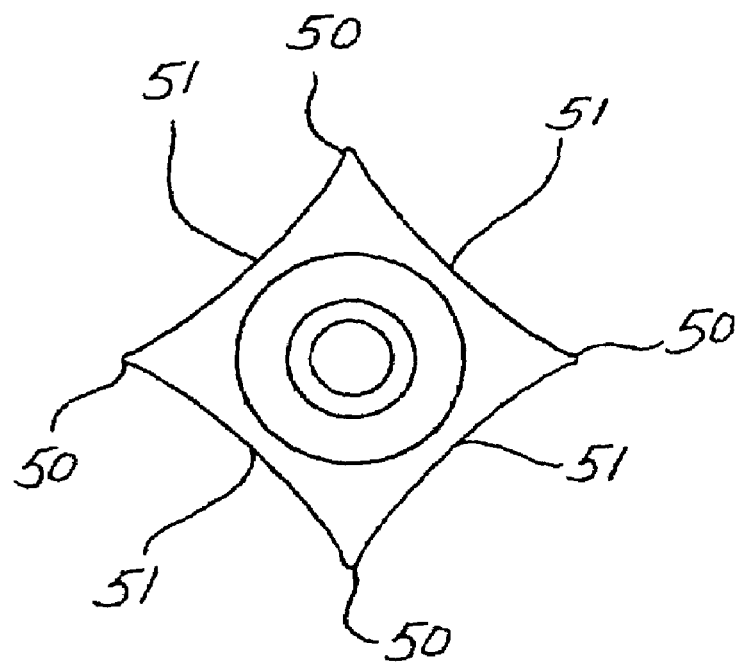
FIG. 3B is a side view of the piston rod of the present invention.

It will be seen that in order for the apparatus 10 to dampen a driver under a high cycling rate, the piston rod 14 is allowed to freely move toward a rearward position, wherein the driver drives the piston rod 14 toward the rearward end 45 of the housing 12, and is dampened when moving toward a forward position, wherein the driver pulls the piston rod 14 toward the forward end 19 of the housing 12. The piston rod 14 may freely move to the rearward position because the piston rod 14 has four radially extending and circumferentially spaced finger-like projections or fingers 50 that integrally extend from the outer diameter of the piston rod 14. These fingers 50 extend radially along a substantially common plane, substantially perpendicular to the longitudinal axis of the housing 12. The fingers 50 have a cross-section which resembles a diamond shape, as shown in FIG. 3B, wherein sides 51 connecting the points of the diamond shape are substantially arcuate.

Figure 4:
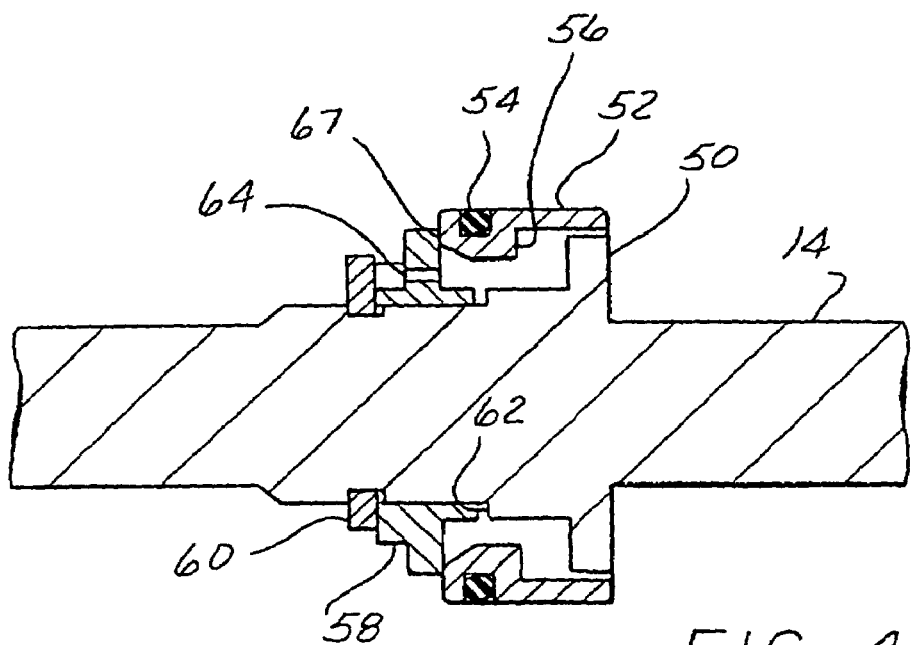
FIG. 4 is a sectional view showing the retainer, piston head, and piston rod of the present invention.

The fingers 50 of the piston rod 14 are coaxial with a substantially cylindrical piston head 52 such that a portion of the fingers 50 and the piston head 52 are in telescopic engagement, as seen in FIGS. 1 and 4. A piston ring seal 54 is seated in a slot on the outer diameter of the piston head 52 to seal the piston head 52 against the inner wall 26 of the housing 12, as seen in FIG. 4. The piston head 52 has a shoulder 56 that is engageable with the fingers 50 of the piston rod 14 so that when the piston rod 14 moves toward the rearward position, the fingers 50 of the piston rod 14 engage the shoulder 56 of the piston head 52 and drive the piston head 52 toward the rearward position.

In order to dampen the travel of the piston rod 14 toward the forward position, a piston head retainer 58 is connected to the piston rod 14 rearward of the piston head 52 and fingers 50. The piston head retainer 58 is substantially cylindrical and has a bore extending therethrough for receiving the piston rod 14, as seen in FIGS. 1 and 4. The piston head retainer 58 is captured by a snap ring 60, rearward of the piston head retainer 58, and a shoulder 62 formed on the outer diameter of the piston rod 14 forward of the piston head retainer 58. The piston head retainer 58 also provides an orifice or aperture 64 extending therethrough. The orifice 64 has a longitudinal axis that is substantially parallel to the longitudinal axis 16 of the housing 12. The outer diameter of the piston head retainer 58 is large enough that a face 67 of the piston head retainer 58 engages the rearward end of the piston head 52 when the piston head 52 travels toward the forward position.

To connect the driving member to the apparatus 10, the clevis 20 is connected to the forward end of the piston rod 14 by a fastener 66, as seen in FIG. 1. The clevis 20 has a slot 68 extending therethrough for receiving the driving member, as seen in FIG. 1. The driving member is retained within the slot 68 by a fastener (not shown) extending through a cross hole 70 provided in the clevis 20.

In operation, the piston rod 14 starts in the forward position. When the driving member begins to cycle, the driving member drives the piston rod 14 toward the rearward end 45 of the housing 12, against the bias of a compression spring 72 located between the piston head retainer 58 and the rearward bearing 32. The piston head 52 starts by having its rearward end in engagement with the front face 67 of the piston head retainer 58. A space exists between the shoulder 56 of the piston head 52 and the fingers 50 of the piston rod 14. As the piston rod 14 is driven toward the rearward position, the fingers 50 approach the shoulder 56 of the piston head 52 until the fingers 50 engage the shoulder 56 of the piston head 52 and drive the piston head 52 toward the rearward portion of the housing 12. Fluid or oil is allowed to freely flow between the space created between the piston head retainer 58 and the piston head 52 and through the spaces created between the fingers 50 of the piston rod 14. By allowing the fluid or oil to freely flow, the piston rod 14 may freely move toward the rearward position.

When the piston rod 14 reaches the rearward position, the driving member begins to cycle back toward the forward position. When this occurs, the compression spring 72 begins to force the piston rod 14, along with the piston head retainer 58 and the fingers 50, toward the forward position. The piston head 52 remains idle until the piston head retainer 58 travels forward enough to engage the rearward end of the piston head 52. The fluid or oil is then prevented from flowing between the piston head retainer 58 and the piston head 52 thereby forcing the fluid or oil to pass through the orifice 64 in the piston head retainer 58. This dampens or slows the speed at which the piston rod 14 can return back to the forward position thereby slowing the return of the driving member. The speed at which the piston rod 14 may return to the forward position may be adjusted by adjusting the size of the orifice 64 in the piston head retainer 58. A smaller orifice 64 will slow the speed of the piston rod 14 while a larger orifice 64 will increase the speed of the piston rod 14 back to its forward position.

It should be noted that if the apparatus 10 is utilized in a corrosive environment, the piston rod 14 may be chromeplated, and the housing, as well as other parts, may be nickel plated. These as well as other non-corrosive materials may also be utilized.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims, the scope is to be accorded the broadest interpretation so as to encompass all such modifications and equivalent structures as is permitted under the law.

What is claimed is:

1. A high frequency dampening apparatus, comprising:
    an enclosed housing having a fluid disposed therein;
    a piston rod slidably disposed within said housing, and said piston rod engageable with a driver for movement between a forward position and a rearward position;
    a first structure extending from said piston rod and having a first passageway extending therethrough;
    a second structure extending from said piston rod and axially spaced from said first structure, and said second structure having a second passageway smaller than said first passageway;
    a piston head captured between said first and second structures for movement between said rearward position, wherein said piston head engages said first structure when moving toward said rearward position allowing said fluid to freely flow through said first passageway and allowing said piston rod to freely travel to said rearward position, and said forward position, wherein said piston head engages said second structure when moving toward said forward position restricting the flow of fluid through said second passageway to slow the travel of said piston rod to said forward position;
    a first compression spring disposed within said housing and seated against said second structure to bias said piston rod toward said forward position;
    a piston rod bearing disposed within said housing for slidably and sealingly receiving said piston rod, and said piston rod bearing engaging said first compression spring; and
    a second compression spring disposed within said housing and seated against said housing and said piston rod bearing for maintaining fluid pressure within said housing.

2. The high frequency dampening apparatus stated in claim 1, further comprising:
    said housing having a fluid-filled port for replenishing said housing with said fluid without having to disassemble said apparatus.

3. A high frequency dampening apparatus, comprising:
    an enclosed housing having a fluid disposed therein;
    a piston rod slidably disposed within said housing, and said piston rod engageable with a driver for movement between a forward position and a rearward position;
    a first structure extending from said piston rod and having a first passageway extending therethrough;
    a second structure extending from said piston rod and axially spaced from said first structure, and said second structure having a second passageway smaller than said first passageway;
    a piston head captured between said first and second structures for movement between said rearward position, wherein said piston head engages said first structure when moving toward said rearward position allowing said fluid to freely flow through said first passageway and allowing said piston rod to freely travel to said rearward position, and said forward position, wherein said piston head engages said second structure when moving toward said forward position restricting the flow of fluid through said second passageway to slow the travel of said piston rod to said forward position;
    a first compression spring disposed within said housing and seated against said second structure to bias said piston rod toward said forward position;
    a piston rod bearing disposed within said housing for slidably and sealingly receiving said piston rod, and said piston rod bearing engaging said first compression spring;
    a second compression spring disposed within said housing and seated against said housing and said piston rod bearing for maintaining pressure within said housing; and
    a substantially diamond-shaped cross section substantially integral with said piston rod.

4. The high frequency dampening apparatus stated in claim 1, said second structure further comprising:
    a retainer extending radially outward from said piston rod and having an aperture extending therethrough.

5. The high frequency dampening apparatus stated in claim 1, further comprising:
    said piston rod having an end portion extending outside of said housing, and said end portion of said piston rod engageable with said driver.

6. A high frequency dampening apparatus, comprising:
    an enclosed housing having a fluid disposed therein;
    a piston rod at least partially disposed within said housing and engageable with a driver, wherein said piston rod is movable between a forward position and a rearward position relative to said housing;
    a substantially diamond-shaped projection extending radially outward from and integral with said piston rod;
    a retainer connected to and extending radially outward from said piston rod, and said retainer having an aperture extending therethrough;
    a piston head having a first portion captured between said diamond-shaped projection and said retainer and a second portion telescopically engageable with said diamond-shaped projection of said piston rod, and said piston head movable between said rearward position wherein said diamond-shaped projection engages said piston head when moving toward said rearward position allowing said fluid to freely flow through said diamond-shaped projection and allowing said piston rod to freely travel to said rearward position, and said forward position, wherein said piston head engages said retainer when moving toward said forward position restricting the flow of said fluid through said aperture in said retainer to slow the travel of said piston rod toward said forward position; and
    a compression spring disposed within said housing and against said retainer to bias said piston rod toward said forward position.

7. The high frequency dampening apparatus stated in claim 6, further comprising:
    said housing having a fill port having a longitudinal axis substantially perpendicular to a longitudinal axis of said housing for replenishing said housing with said fluid without disassembling said apparatus.

8. The high frequency dampening apparatus stated in claim 6, further comprising:
said piston head having a recess for receiving an O-ring seal for slidably and sealably engaging an inside surface of said housing.

9. The high frequency dampening apparatus stated in claim 6, further comprising:
said piston rod having an end portion extending outside of said housing, and said end portion of said piston rod engageable with said driver.

10. A high frequency dampening apparatus, comprising:
an enclosed housing having a fluid disposed therein:
a piston rod at least partially disposed within said housing and engageable with a driver, wherein said piston rod is movable between a forward position and a rearward position relative to said housing;
at least one projection extending radially outward from said piston rod;
a retainer connected to and extending radially outward from said piston rod and said retainer having an aperture extending therethrough;
a piston head captured between said at least one projection and said retainer, and said piston head movable between said rearward position, wherein said at least one projection engages said piston head when moving toward said rearward position allowing said fluid to freely flow around at least one projection and allowing said piston rod to freely travel to said rearward position, and said forward position, wherein said piston head engages said retainer when moving toward said forward position restricting the flow of said fluid through said aperture in said retainer to slow the travel of said piston rod toward said forward position;
a pair of piston rod bearings sealably disposed within said housing for slidably and sealably receiving said piston rod; and
a first compression spring disposed within said housing and against said retainer to bias said piston rod toward said forward position.

11. The high frequency dampening apparatus stated in claim 10, further comprising:
said pair of piston rod bearings axially spaced along a longitudinal axis of said housing; and
a fluid chamber formed within said housing and between said pair of piston rod bearings for maintaining fluid pressure.

12. The high frequency dampening apparatus stated in claim 11, further comprising:
at least one of said piston rod bearings slidably mounted within said housing; and
a second spring mounted adjacent said at least one of said piston rod bearings and outside said fluid chamber, and said second spring biasing said piston rod bearings toward each other to maintain a predetermined level of fluid pressure within said fluid chamber.

13. A high frequency dampening apparatus comprising:
an enclosed housing having a fluid disposed therein;
a piston rod at least partially disposed within said housing and engageable with a driver wherein said piston rod is movable between a forward position and a rearward position relative to said housing;
a substantially diamond-shaped cross section projection integral with and extending radially outward from said piston rod;
a retainer connected to and extending radially outward from said piston rod, and said retainer having an aperture extending therethrough;
a compression spring disposed within said housing and cooperatively engaging said retainer for biasing said piston toward said forward position;
a piston head having a recess and a flexible O-ring mounted therein for slidably and sealably engaging an inside surface of said housing; and
said piston head having a first portion captured between said diamond-shaped projection and said retainer and a second portion telescopically engaging said diamond-shaped projection of said piston rod, and said piston head moveable between said rearward position, wherein said diamond-shaped projection engaging said piston head when moving toward said rearward position allowing said fluid to flow freely through said diamond-shaped projection to allow said piston rod to freely travel to said rearward position, and said forward position, wherein said piston head engages said retainer when moving toward said forward position restricting the flow of fluid through said aperture in said retainer to slow the travel of said piston rod toward said forward position.

14. The high frequency dampening apparatus stated in claim 13, comprising:
said enclosure having a fill port having a longitudinal axis substantially perpendicular to a longitudinal axis of said enclosure and having a removable plug for replenishing said enclosure with said fluid without disassembling said apparatus.

15. The high frequency dampening apparatus stated in claim 13, further comprising:
said piston rod having an end portion extending outside of said housing; and
a clevis connected to said end portion of said piston rod and engageable with said driver.

16. A high frequency dampening apparatus, comprising:
an enclosed housing having a fluid disposed therein:
a piston rod at least partially disposed within said housing and engageable with a driver wherein said piston rod is movable between a forward position and a rearward position relative to said housing;
a plurality of finger-like projections circumferentially spaced and extending radially outward from said piston rod;
a retainer connected to and extending radially outward from said piston rod, and said retainer having an aperture extending therethrough;
a compression spring disposed within said housing and cooperatively engaging said retainer for biasing said piston toward said forward position;
a piston head slidably and sealably engaging an inside surface of said housing, and said piston head captured between said finger-like projections and said retainer and moveable between said rearward position, wherein said finger-like projections engage said piston head when moving toward said rearward position allowing said fluid to flow freely between said finger-like projections to allow said piston rod to freely travel to said rearward position, and said forward position, wherein said piston head engages said retainer when moving toward said forward position restricting the flow of fluid through said aperture in said retainer to slow the travel of said piston rod toward said forward position; and
a pair of piston rod bearings sealably disposed within said housing for slidably and sealably receiving said piston rod.

17. The high frequency dampening apparatus stated in claim 16, further comprising:

said pair of piston rod bearings axially spaced along the longitudinal axis of said housing; and a fluid chamber formed within said housing and between said pair of piston rod bearings for maintaining said fluid.

18. The high frequency dampening apparatus stated in claim 17, further comprising:

at least one of said pair of piston rod bearings slidably mounted within said housing; and a second spring mounted adjacent said at least one of said pair of piston rod bearings and outside said fluid chamber, and said second spring biasing said piston rod bearings toward each other to maintain a predetermined level of fluid pressure within said fluid chamber.

19. A high frequency dampening apparatus, comprising:

an enclosed housing having a single chamber, and said chamber containing a fluid disposed therein;

a piston rod slidably disposed within said housing, and said piston rod engageable with a driver for movement between a forward position and a rearward position;

a piston assembly coupled to said piston rod and disposed within said chamber, and said piston assembly providing greater flow restriction to said fluid when said piston rod moves toward said forward position as compared to when said piston rod moves toward said rearward position;

a pair of piston rod bearings disposed within said housing and defining ends of said chamber;

a first compression spring disposed within said housing and seated against one of said pair of piston rod bearings to bias said one of said piston rod bearings toward the other of said pair of piston rod bearings to pressurize said fluid within said chamber; and a second compression spring disposed within said chamber and seated against said piston assembly to bias said piston rod toward said forward position.

\* \* \* \* \*